United States Patent [19]

Krüger

[11] Patent Number: 4,458,647

[45] Date of Patent: Jul. 10, 1984

[54] MIXTURE COMPRESSING INTERNAL-COMBUSTION ENGINE INCLUDING AN ANTI-KNOCKING DEVICE

[75] Inventor: Hermann Krüger, Wolfsburg, Fed. Rep. of Germany

[73] Assignee: Volkswagenwerk Aktiengesellschaft, Wolfsburg, Fed. Rep. of Germany

[21] Appl. No.: 415,467

[22] Filed: Sep. 7, 1982

[30] Foreign Application Priority Data

Oct. 17, 1981 [DE] Fed. Rep. of Germany ....... 3141341

[51] Int. Cl.³ ............................ F02P 5/14; F02D 9/00
[52] U.S. Cl. .................................. 123/435; 123/436; 123/425
[58] Field of Search ............... 123/435, 425, 436, 414, 123/422, 421, 462, 398, 339

[56] References Cited

U.S. PATENT DOCUMENTS

| | | | |
|---|---|---|---|
| 2,747,561 | 5/1956 | Dietrich | 123/435 |
| 2,798,468 | 5/1957 | Heidner | 123/398 |
| 4,171,686 | 10/1979 | Chenet | 123/339 |
| 4,261,315 | 4/1981 | Geiger et al. | 123/435 |
| 4,321,902 | 3/1982 | Stoltman | 123/435 |
| 4,363,303 | 12/1982 | Takayama | 123/339 |
| 4,364,353 | 12/1982 | Fiala | 123/435 |
| 4,366,793 | 1/1983 | Coles | 123/436 |
| 4,391,245 | 7/1983 | Larson | 123/339 |

OTHER PUBLICATIONS

"Buick's Turbocharged V-6 Powertrain for 1978", Wallace, Society of Automotive Engineers, Inc., SAE Technical Paper 780413.

Primary Examiner—Raymond A. Nelli
Attorney, Agent, or Firm—Spencer & Frank

[57] ABSTRACT

A mixture compressing internal-combustion engine having a combustion chamber, an intake conduit for introducing a combustible mixture into the combustion chamber, a throttle valve for controlling the flow of the mixture in the intake conduit and apparatus for reducing knocking in the engine. The knock reducing apparatus includes a knocking sensor coupled to the combustion chamber, control means coupled to the sensor and an adjustable full-load stop positioned within the intake conduit adjacent the throttle valve. The stop is controlled by the control means to vary the full-load opening angle of the throttle by an amount corresponding to the output signal from the control means, a reduction in the full-load opening angle reducing knocking of the engine.

6 Claims, 2 Drawing Figures

MIXTURE COMPRESSING INTERNAL-COMBUSTION ENGINE INCLUDING AN ANTI-KNOCKING DEVICE

BACKGROUND OF THE INVENTION

This invention relates to a mixture compressing internal-combustion engine and, in particular, to an engine wherein the maximum throttle opening is controlled as a function of signals emitted by a knocking sensor.

Conventional anti-knocking devices operate by retarding the moment of ignition whenever a knock sensor signals the occurrence of knocking phenomena. However, such change in the moment of ignition results in a loss of power as well as higher specific fuel consumption.

Copending patent application Ser. No. 219,352 filed Dec. 22, 1980, now U.S. Pat. No. 4,364,353, by Ernst Fiala and assigned to the present assignee, discloses an anti-knocking device in which, when knocking occurs, the firing angle is shifted until a limit value is reached. Thereafter, if knocking has not stopped, the throttle valve serving as the air control member is adjusted to provide a smaller throttle opening. However, this results in some increase in specific fuel consumption during knocking.

German Offenlegungsschrift No. 2,551,912 discloses the provision of a deformable hollow bellows in the connection between the gas or accelerator pedal and the throttle, the interior of the hollow bellows being in communication with the suction side of the engine suction line. The interposition of the bellow between the gas pedal and the throttle tends to prevent knocking, rather than eliminating knocking that has already occurred, by reducing the opening angle of the throttle under high load. This occurs because the length of the link between the throttle and gas pedal is increased when a signal indicating a low suction pipe vacuum has been received. A disadvantage to this system is that it is not a regulating process in which the throttle opening is reduced upon the occurrence of knocking until knocking disappears. Rather, the bellows and other retraction spring devices perform a one-time "calibration" of the throttle with respect to the respective fuel employed, and a permanent power loss must be accepted regardless of whether knocking is actually present.

An object of the present invention is to provide an anti-knocking device which acts as a regulator in that it permits driving at the knocking limit while avoiding permanent power loss. Further, if knocking does occur, the specific fuel consumption is not increased.

SUMMARY OF THE INVENTION

In accordance with the present invention, a mixture compressing internal-combustion engine is provided having a combustion chamber, an intake conduit for introducing a combustible mixture into the combustion chamber, a throttle valve for controlling the flow of the mixture in the intake conduit and apparatus for reducing knocking of the engine. The knock reducing apparatus includes a knocking sensor coupled to the combustion chamber, control means coupled to the sensor which has at least one output for generating a signal corresponding to an engine knocking condition and an adjustable full-load stop positioned within the intake conduit adjacent the throttle valve. The stop is controlled by the control means to vary the full-load opening angle of the throttle by an amount corresponding to the output signal from the control means, a reduction in the full-load opening angle reducing knocking of the engine.

Thus, knocking is controlled without changing the moment of firing as in prior art devices. Further, the invention employs components already existing in the internal-combustion engine as well as tested sensors.

DESCRIPTION OF A PREFERRED EMBODIMENT

Figure 1:
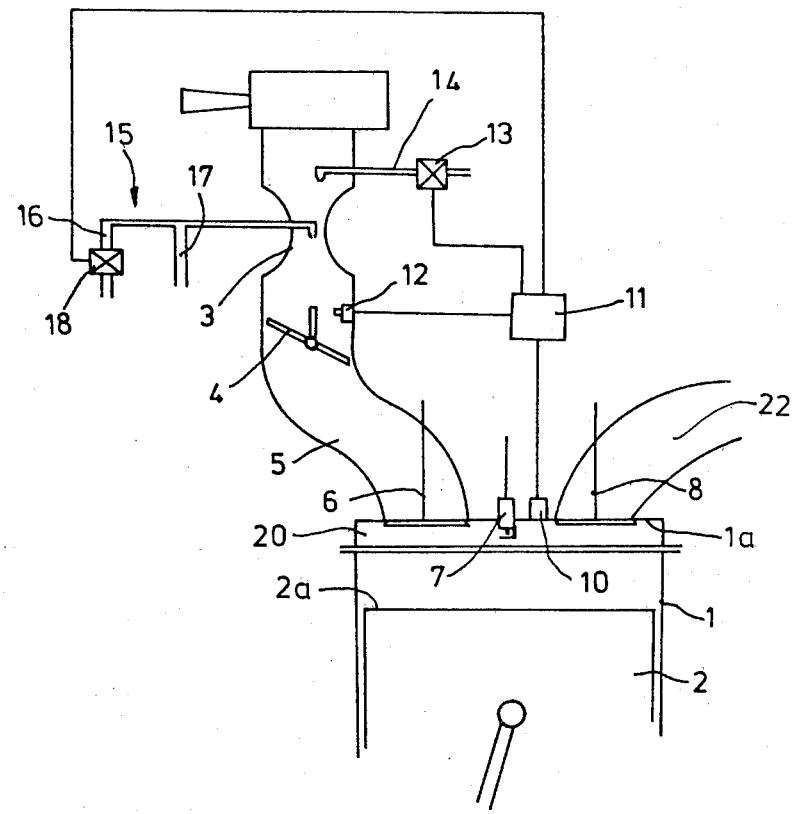
FIG. 1 is a schematic longitudinal sectional center view of a part of an internal-combustion engine embodying the invention.

Referring to FIG. 1, there is shown schematically a cylinder 1 of a multicylinder, externally ignited, mixture-compressing internal combustion engine. A piston 2, which is connected to a crank shaft (not shown) slides with a reciprocating motion within the cylinder 1. The top face 2a of the piston and the head 1a of the cylinder define a combustion chamber 20 having a variable volume. An intake conduit 5 is connected to the combustion chamber 20 through an intake valve 6 and an exhaust conduit 22 is connected to the combustion chamber through an exhaust valve 8. A spark plug 7 projects into the combustion chamber 20 for igniting the combustion mixture within the chamber when the piston 2 reaches a position at or near the upper dead center location at the end of the compression stroke.

A carburetor 3 is located in the intake conduit 5 for mixing fuel with the intake air in a quantity corresponding to the instantaneous operational condition of the engine. An intake manifold (not shown) leads to the other cylinders of the engine. A throttle valve 4, which is acutated by an accelerator pedal (not shown) for controlling the output of the engine, is interposed between the carburetor 3 and the intake manifold.

An adjustable full-load stop 12 projects into the intake conduit at the throttle valve 4. The position of the stop 12 is determined by the output of a knocking sensor 10 which is coupled to the operating mechanism of the stop by a control unit 11. Knocking 10 may be of the magnetostrictive type an example of which is shown and described in SAE Technical Paper 780413, especially page 10, or of any other type, e.g. a piezoelectric sensor. When knocking is detected by the sensor 10, a signal generated by the control unit 11 moves the stop in a direction to reduce the full-load throttle opening angle until a point is reached at which knocking is eliminated thereby providing a regulating process.

Knocking sensor 10 is arranged in such manner that it delivers signals to the control unit 11 when knocking occurs in any of the combustion chambers of the engine. For instance the knocking sensor may be fixed to a cylinder head common to all of the combustion chambers. It is also possible to provide an individual knocking sensor for each combustion chamber and to connect the outputs of all the knocking sensors to the input of the control unit 11.

The internal combustion engine is further provided with a full-load enrichment intake pipe 14 having a shut off valve 13 of the electromagnetic type and operated by the control unit 11. When knocking is detected by the sensor 10, an electric signal is generated by the control unit 11 which closes valve 13 thereby cutting off fuel through pipe 14 and reducing the fuel/air ratio until sensor 10 no longer detects knocking.

Full load enrichment normally operates only under full-load, high engine rpm conditions. However, knocking also occurs under full load at low rpm and therefore, in order to control knocking under such conditions, instead of providing valve 13 within full-load enrichment pipe 14 it may be advantageous to feed the fuel to the main jet system 15 through branch lines 16 and 17 and to provide one of the branch lines 16 with a valve 18 of the electromagnetic type and controlled by the control unit 11 in response to signals from the knocking sensor 10 in order to reduce the fuel/air ratio when knocking is detected.

Figure 2:
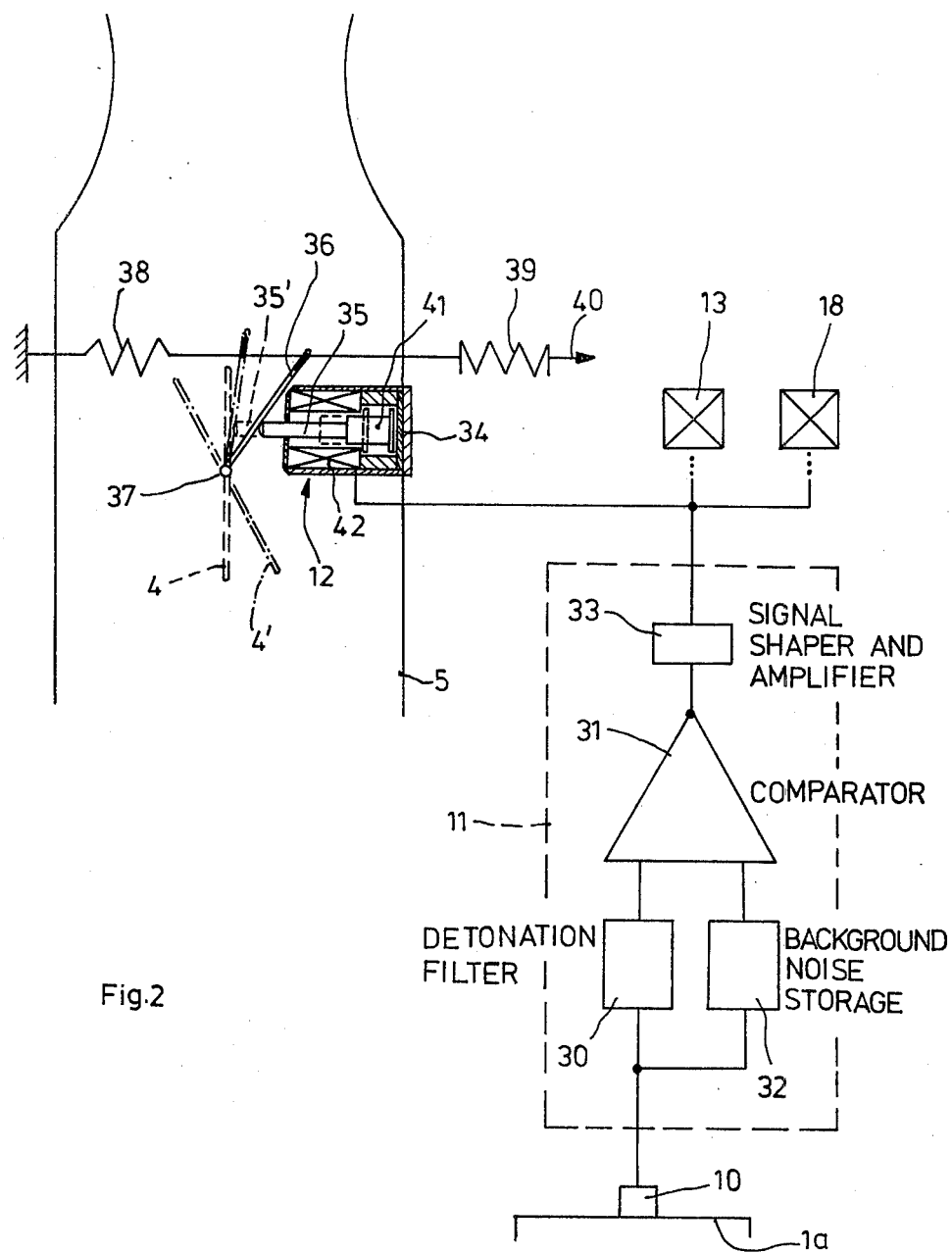
FIG. 2 shows details of examples for the full load stop (in a longitudinal sectional center view) and the control unit.

The outputs from control unit 11 contains information related only to knocking phenomena and not to other characteristics caused by normal operation of the internal-combustion engine. The operation of the control unit is as follows:

Reference is made to FIG. 2. Control unit 11 comprises, as is known per se from the SAE Paper referred to above, a detonation filter 30 permitting only those output signals of knocking sensor 10 to reach comparator 31 which have a frequency significant for the occurrence of knocking. Control unit 11 further comprises means 32 for continuously measuring and storing the level of output signals of knocking sensor 10 resulting from background noise created by the engine running without knocking. Only output signals of the knocking sensor 10 which have the "knocking frequency" and a level higher than the level of the background noise are allowed to pass comparator 31 and to create shut-off signals for the valves 13 and 18, respectively, and signals for the adjustable stop 12 at the output of amplifier and signal shaper 33. Devices 12, 13 and 18 all can be controlled by the same signals at the output of device 33.

Adjustable full-load stop 12 which is fastened by bracket 34 to intake conduit 5 comprises a plunger 35 constituting the stop proper for lever 36. Said lever is coupled to the axis of rotation 37 of throttle valve 4. Spring 38 acting on lever 36 tends to rotate throttle valve 4 in its closed idle position; while spring 39, which is stronger than spring 38, is arranged between lever 36 and a cable 40 which is connected to the usual acceleration pedal, not shown in the drawing.

Plunger 35 comprises armature 41 which is made from ferrous material and operates in the magnetic field of coil 42 created by the electric signals produced by amplifier 33. As long as no knocking occurs plunger 35 assumes its position shown by continuous lines so that throttle valve 4 can be moved into its fully opened position via cable 40 and spring 39. If, on the other hand, knocking occurs, plunger 35 is moved to the left into its position 35', rotating the throttle valve to its partly closed position 4'. This is true despite the fact that cable 40 remains in its position because spring 39 is lengthened.

It will be understood that the above description of the present invention is susceptible to various modifications, changes and adaptations, and the same are intended to be comprehended within the meaning and range of equivalents of the appended claims.

What is claimed is:

1. A mixture compressing internal-combustion engine having a combustion chamber, an intake conduit for introducing air or a combustible mixture into said combustion chamber for igniting at a predetermined firing angle and a throttle valve for controlling the flow of the air or the mixture in said intake conduit, said engine including apparatus for reducing knocking therein without changing said predetermined firing angle, comprising:
   a knocking sensor coupled to said combustion chamber, said knocking sensor generating an output signal;
   control means having an input coupled to the output of said knocking sensor and at least one output generating a signal corresponding to engine knocking; and
   an adjustable full-load stop means positioned within said intake conduit adjacent said throttle valve and coupled to an output of said control means for reducing the full-load opening angle of said throttle valve by an amount corresponding to the output signal from said control means, whereby knocking of said engine is reduced.

2. A mixture compressing internal-combustion engine having a combustion chamber, an intake conduit for introducing a combustible mixture into said combustion chamber for igniting at a predetermined firing angle and a throttle valve for controlling the flow of the mixture in said intake conduit, said engine including apparatus for reducing knocking therein without changing said predetermined firing angle, comprising:
   a knocking sensor coupled to said combustion chamber, said knocking sensor generating an output signal;
   control means having an input coupled to the output of said knocking sensor and at least one output generating a signal corresponding to engine knocking;
   fuel conduit means for introducing fuel into said intake conduit upstream from said throttle valve for providing full-load enrichment of said engine; and
   control valve means located in said fuel conduit means and being coupled to an output of said control means for reducing the full-load enrichment of said engine in response to an output signal from said control means, whereby knocking of said engine is reduced.

3. An internal-combustion engine as defined in claim 2 wherein fuel conduit means comprises a main fuel supply jet system having at least first and second branch lines; and wherein said control valve means is located in one of said branch lines.

4. An internal-combustion engine as defined in claim 1 which further comprises:
   fuel conduit means for introducing fuel into said intake conduit upstream from said throttle valve for providing full-load enrichment of said engine; and
   control valve means located in said fuel conduit means and being coupled to an output of said control means for reducing the full-load enrichment of said engine in response to an output signal from said control means.

5. A method for reducing knocking of a mixture compressing internal-combustion engine having a combustion chamber, an intake conduit for introducing air or a combustible mixture into the combustion chamber for igniting at a predetermined firing angle and a throttle valve for controlling the flow of the air or the mixture in the intake conduit, comrising:

producing a control signal corresponding to engine knocking; and reducing the full-load opening angle of the throttle valve in response to and by an amount corresponding to the control signal without changing the predetermined firing angle.

6. A method for reducing knocking of a mixture compressing internal-combustion engine having a combustion chamber, an intake conduit for introducing a combustible mixture into the combustion chamber for igniting at a predetermined firing angle, a throttle valve for controlling the flow of the mixture in the intake conduit and a fuel conduit means for introducing fuel into the intake conduit upstream from the throttle valve for providing full-load enrichment of the engine, comprising:

producing a control signal corresponding to engine knocking; and reducing the full-load enrichment of the engine by reducing the flow of fuel through the fuel conduit means in response to the control signal without changing the predetermined firing angle.

* * * * *